United States Patent
Sakai et al.

(10) Patent No.: US 8,237,899 B2
(45) Date of Patent: Aug. 7, 2012

(54) LIQUID CRYSTAL DISPLAY DEVICE

(75) Inventors: Akira Sakai, Osaka (JP); Masahiro Hasegawa, Osaka (JP); Ikuo Ninomiya, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 105 days.

(21) Appl. No.: 12/864,364

(22) PCT Filed: Nov. 19, 2008

(86) PCT No.: PCT/JP2008/071037
§ 371 (c)(1),
(2), (4) Date: Jul. 23, 2010

(87) PCT Pub. No.: WO2009/113208
PCT Pub. Date: Sep. 17, 2009

(65) Prior Publication Data
US 2010/0296037 A1 Nov. 25, 2010

(30) Foreign Application Priority Data
Mar. 13, 2008 (JP) .................. 2008-064102

(51) Int. Cl.
*G02F 1/1335* (2006.01)
(52) U.S. Cl. ........................................ 349/117
(58) Field of Classification Search ............. 349/117
See application file for complete search history.

(56) References Cited

U.S. PATENT DOCUMENTS

| | | | |
|---|---|---|---|
| 6,281,956 B1 | 8/2001 | Ohmuro | |
| 6,339,460 B1 | 1/2002 | Saitoh | |
| 6,642,981 B1 | 11/2003 | Ohmuro et al. | |
| 6,661,488 B1 | 12/2003 | Takeda | |
| 6,724,452 B1 | 4/2004 | Takeda | |
| 7,167,224 B1 | 1/2007 | Takeda | |
| 7,224,421 B1 | 5/2007 | Takeda | |
| 7,304,703 B1 | 12/2007 | Takeda | |
| 2004/0119924 A1 | 6/2004 | Takeda | |
| 2005/0248704 A1 | 11/2005 | Ohmuro | |
| 2006/0132686 A1 | 6/2006 | Jeon | |
| 2006/0203150 A1 | 9/2006 | Ohmuro | |
| 2007/0064187 A1 | 3/2007 | Takeda | |

(Continued)

FOREIGN PATENT DOCUMENTS

| | | |
|---|---|---|
| JP | 10-153802 | 6/1998 |
| JP | 11-258605 | 9/1999 |
| JP | 2000-39610 | 2/2000 |

(Continued)

OTHER PUBLICATIONS

International Search Report for PCT/JP2008/071037, mailed Feb. 3, 2009.

*Primary Examiner* — Phu Vu
(74) *Attorney, Agent, or Firm* — Nixon & Vanderhye P.C.

(57) ABSTRACT

The present invention provides a liquid crystal display device having a high contrast ratio and no coloring during black display, over a wide viewing angle range. The liquid crystal display device of the present invention includes a reverse wavelength dispersion-type biaxial retardation film having $R0(B)/R0(G)$ and $Rth(B)/Rth(G)$ not greater than 0.965 and $R0(R)/R0(G)$ and $Rth(R)/Rth(G)$ not smaller than 1.015; and a vertical alignment liquid crystal cell that has a blue, a green, and a red color filter layer and that satisfies $Rth\_LC(B)/Rth\_LC(G) \leq 1.000$ and $Rth\_LC(R)/Rth\_LC(G) \geq 1.000$. $R0(B)$, $R0(G)$ and $R0(R)$ denote the in-plane retardations of the retardation film at wavelengths 450 nm, 550 nm and 650 nm. $Rth(B)$, $Rth(G)$ and $Rth(R)$, and $Rth\_LC(B)$, $Rth\_LC(G)$ and $Rth\_LC(R)$ respectively denote the thickness-direction retardations of the retardation film and the liquid crystal cell at wavelengths 450 nm, 550 nm and 650 nm.

8 Claims, 4 Drawing Sheets

| U.S. PATENT DOCUMENTS | | | | FOREIGN PATENT DOCUMENTS | | |
|---|---|---|---|---|---|---|
| 2007/0242188 A1 | 10/2007 | Sakai | | | | |
| 2008/0165314 A1 | 7/2008 | Takeda | JP | 2000-131693 | 5/2000 | |
| 2008/0239213 A1 | 10/2008 | Ohmuro | JP | 2006-515686 | 6/2006 | |
| 2008/0303997 A1 | 12/2008 | Takeda | JP | 2007-334308 | 12/2007 | |
| 2009/0207360 A1 | 8/2009 | Takeda | WO | 2004/068226 | 8/2004 | |
| 2009/0213305 A1 | 8/2009 | Ohmuro | WO | 2006/001448 | 1/2006 | |
| 2009/0268133 A1 | 10/2009 | Yoshimi | WO | WO 2007/132629 A1 | 11/2007 | |

LIQUID CRYSTAL DISPLAY DEVICE

This application is the U.S. national phase of International Application No. PCT/JP2008/071037, filed 19 Nov. 2008, which designated the U.S. and claims priority to Japanese Application No. 2008-064102, filed 13 Mar. 2008, the entire contents of each of which are hereby incorporated by reference.

TECHNICAL FIELD

The present invention relates to a liquid crystal display (LCD) device. More particularly, the present invention relates to an LCD device suitable for LCD devices that have an optimally designed wavelength dispersion characteristic of a liquid crystal (LC) cell and a retardation film.

BACKGROUND ART

LCD devices are widely used as display devices in computers, televisions and other information processing devices. In particular, LCDs of TFT type (hereinafter also referred to as "TFT-LCDs") are widely used and their market is expected to keep on growing, with an accompanying demand for ever greater image quality. The explanation below deals with a TFT-LCD example, but the present invention is not limited to TFT-LCDs, and is also applicable to passive matrix type LCDs, plasma-address LCDs and the like, and is generally applicable to all LCDs that perform display on the basis of an LC that is sandwiched between a pair of substrates having respective electrodes formed thereon, wherein voltage is applied across the electrodes.

To date, the most widely used mode in TFT-LCDs is the so-called TN mode, in which an LC having positive dielectric anisotropy is aligned horizontally between mutually opposing substrates. In TN-mode LCD devices, the alignment direction of the LC molecules adjacent to one of the substrates is twisted by 90 degrees with respect to the alignment direction of the LC molecules that are adjacent to the other substrate. Such TN-mode LCD devices are manufactured in accordance with an established manufacturing technology that is inexpensive and industrially mature, although there remains room for improvement in that high contrast is difficult to realize.

Meanwhile, so-called VA LCD devices have also been disclosed in which an LC having negative dielectric anisotropy is aligned vertically between mutually opposing substrates (for instance, Patent Document 1). As disclosed in Patent Document 1, for instance, in a VA (vertical alignment) LCD device, the LC molecules are aligned in a direction substantially vertical to the substrate surface when no voltage is applied, and hence the LC cell exhibits virtually neither birefringence nor optical rotation, and light passes through the LC cell without hardly any change in the polarization state thereof. Therefore, substantially complete black display can be realized, when no voltage is applied, by arranging a pair of linear polarizers with the LC cell therebetween in such a manner that the absorption axes thereof are substantially orthogonal to each other. When a voltage is applied, the LC molecules become tilted substantially parallel to the substrates, and exhibit as a result large birefringence that translates into white display. Therefore, such VA LCD devices can easily realize very high contrast, which is not possible in TN mode.

However, the VA LCD device having the configuration described above has room for improvement in that the viewing angle cannot be widened easily. VA LCD devices afford substantially complete black display, since an LC cell exhibits virtually no birefringence in frontal view, and two polarizers are completely orthogonal to each other, as described above. The LC cell, however, exhibits birefringence and has apparent retardation at an oblique viewing angle. Also, the geometric relative relationship of the two polarizers is no longer apparent orthogonality, and hence light leakage occurs, which results in lower contrast and narrower viewing angle. In VA LCD devices, therefore, a retardation film is often arranged with a view to canceling the extra retardation of the LC cell in the oblique viewing angle, and with a view to maintaining the orthogonality of the cross-Nicol arranged polarizers, at the oblique viewing angle. For example, conventional techniques disclosed for widening the viewing angle involve arranging polarizers on both sides of a VA LC cell, and arranging, between the polarizer and the LC cell, at least one retardation film from among a uniaxial retardation film (so-called positive A plate) having an in-plane optic axis and wherein extraordinary index>ordinary index, a uniaxial retardation film (so-called negative C plate) having an out-of-plane (film normal direction) optic axis and wherein extraordinary index<ordinary index, or a biaxial retardation film, (for instance, Patent Documents 1 to 4).

To achieve a wider viewing angle in a VA LCD device, as described above, it is important to (1) maintain orthogonality of the polarizers in a cross-Nicol arrangement at the oblique viewing angle, similar to that in frontal view, and (2) cancel the extra retardation of the LC cell at the oblique viewing angle. Conventionally, (1) and (2) are achieved by arranging appropriate retardation films. This approach for widening the viewing angle through the use of retardation films is widely known. In all conventional techniques, however, the design of the retardation conditions is optimized for a single wavelength alone (ordinarily around 550 nm), and thus light leakage occurs upon black display at wavelengths other than the design wavelength. Therefore, there is room for improvement as regards the occurrence of coloring at oblique viewing angles.

In order to solve the above problems, the inventors filed an earlier patent application (for instance, see Patent Document 5), on the basis of the finding that the above problem can be solved by using reverse wavelength dispersion retardation films (reverse wavelength dispersion-type retardation films) in which there are completely separated, in terms of wavelength dispersion characteristic, (1) preservation of the orthogonality of polarizers disposed in a cross-Nicol arrangement at an oblique viewing angle, in the same way as in frontal view, during black display; and (2) cancellation of the extra retardation in the LC cell at an oblique viewing angle, such that (1) and (2) are compensated for each different retardation film in the LCD device.

[Patent Document 1]
   Japanese Kokai Publication No. 2000-39610
[Patent Document 2]
   Japanese Kokai Publication No. Hei-11-258605
[Patent Document 3]
   Japanese Kokai Publication No. Hei-10-153802
[Patent Document 4]
   Japanese Kokai Publication No. 2000-131693
[Patent Document 5]
   WO 06/001448

DISCLOSURE OF THE INVENTION

In Patent Document 5, however, the in-plane retardation |Rxy(550)| at the wavelength 550 nm that is required in each retardation layer is substantial, and hence there remains room for improvement in that the manufacture of such reverse wavelength dispersion retardation films is ordinarily difficult, since, intrinsically, reverse wavelength dispersion retardation films do not elicit retardation. Also, further suppression of coloring at oblique viewing angle range is still called for.

The present invention is devised considering the aforementioned situations. An object of the present invention is to provide an LCD device having a high contrast ratio and that is free of coloring during black display, over a wide viewing angle range.

As a result of various research on LCD devices having a high contrast ratio and being free of coloring over a wide viewing angle range, by tackling the above-described problems (1) and (2), the inventors found that coloring at an oblique viewing angle can be suppressed by using a reverse wavelength dispersion-type biaxial retardation film having low retardation, by compensating the retardation exhibited by LC cell constituent materials other than the LC layer (for instance, color filter layer, transparent electrode materials such as ITO). Thus, the inventors focused on the retardation of the retardation films and the retardation of the LC cell, and found that coloring at an oblique viewing angle can be sufficiently suppressed even when using reverse wavelength dispersion-type biaxial retardation films, having comparatively lower retardation than in conventional cases, by optimizing the retardation of the retardation films at the wavelength 450 nm, the wavelength 550 nm and the wavelength 650 nm, and by optimizing the thickness-direction retardation of the LC cell at the wavelength 450 nm, the wavelength 550 nm and the wavelength 650 nm. The inventors arrived at the present invention on the basis of the above finding, which allows solving the above-described problems.

Specifically, the LCD device of the present invention has a liquid crystal display device, including:

a first polarizer;

a liquid crystal cell;

a second polarizer having an absorption axis azimuth that is orthogonal, in a plan view of a display surface of the liquid crystal cell, to that of the first polarizer, in this order; and a retardation film provided at least one of between the first polarizer and the liquid crystal cell, and between the second polarizer and the liquid crystal cell, wherein the retardation film is a reverse wavelength dispersion-type biaxial retardation film having an in-plane slow axis that is orthogonal, in a plan view of the display surface, to an absorption axis of a polarizer on the same side with respect to the liquid crystal cell, and satisfying equations (1) to (4) below, and the liquid crystal cell is a vertical alignment liquid crystal cell having a pair of transparent substrates, and provided therebetween a liquid crystal layer and at least blue, green and red color filter layers that separate three respective colors of blue, green and red, and satisfying equations (5) and (6) below, $$R0(B)/R0(G) \leq 0.965 \quad (1)$$

$$Rth(B)/Rth(G) \leq 0.965 \quad (2)$$

$$R0(R)/R0(G) \geq 1.015 \quad (3)$$

$$Rth(R)/Rth(G) \geq 1.015 \quad (4)$$

$$Rth\_LC(B)/Rth\_LC(G) \leq 1.000 \quad (5)$$

$$Rth\_LC(R)/Rth\_LC(G) \geq 1.000 \quad (6)$$

where in equations (1) to (4), $R0(B)$, $R0(G)$ and $R0(R)$ denote, respectively, the in-plane retardations of the retardation film at wavelengths 450 nm, 550 nm and 650 nm, $Rth(B)$, $Rth(G)$ and $Rth(R)$ denote, respectively, thickness-direction retardations of the retardation film at wavelengths 450 nm, 550 nm and 650 nm, and in equations (5) and (6), $Rth\_LC(B)$, $Rth\_LC(G)$ and $Rth\_LC(R)$ denote, respectively, thickness-direction retardations of the liquid crystal cell at wavelengths 450 nm, 550 nm and 650 nm.

The present invention is explained in detail below.

The LCD device of the present invention has a first polarizer, an LC cell, a second polarizer having an absorption axis azimuth that is orthogonal, in a plan view of a display surface of the LC cell, to that of the first polarizer, in this order, and a retardation film between the first polarizer and the LC cell and/or between the second polarizer and the LC cell. In the present description, the term "polarizer" denotes an element which converts natural light into linearly polarized light. The polarizer may also be referred to as a polarization device. The first and second polarizers are so designed that one constitutes a polarizer (a back-side polarizer) and the other constitutes an analyzer (a viewing-side polarizer). The LC cell has ordinarily a pair of substrates and an LC layer sandwiched between the pair of substrates. The first polarizer and the second polarizer are disposed in such a manner that the absorption axes thereof are mutually orthogonal, in a plan view of the display surface (cross-Nicol arrangement). In the absence of applied voltage, the above LC cell exhibits virtually no birefringence in the front direction. Therefore, the LCD device of the present invention can realize substantially total black display in the front direction when no voltage is applied. The LCD device of the present invention is not limited to an embodiment in which the absorption axis azimuth (direction) of the first polarizer is perfectly orthogonal, in a plan view of the display surface, to the absorption axis azimuth (direction) of the second polarizer. So long as a high contrast ratio can be obtained in the front direction, the angle formed by the absorption axis azimuth of the first polarizer and the absorption axis azimuth of the second polarizer may deviate from 90°, by about ±1° (more preferably ±0.5°. In the present invention, the polarizer used is assumed to be a so-called O type polarizer in which polyvinyl alcohol (PVA) film with a dichroic anisotropic material such as an iodine complex adsorbed and aligned thereon. An O type polarizer is a polarizer that absorbs light oscillating in a specific direction (defined as the absorption axis) in the plane of the polarizer, and that transmits light oscillating in a direction orthogonal to the absorption axis in the plane of the polarizer, and also light oscillating in the normal direction of the polarizer. In the present description, the term "retardation film" denotes a layer having optical anisotropy, and is synonymous with a birefringent layer, a retardation plate, an optically anisotropic layer, a birefringent medium, an optically anisotropic film, a retardation compensation film and so forth. The retardation film of the present invention may be a sheet.

The above retardation film is a reverse wavelength dispersion-type biaxial retardation film whose in-plane slow axis is orthogonal, in a plan view of the display surface, to the absorption axis of a polarizer that is on the same side with respect to the LC cell, and such that the retardation film satisfies equations (1) to (4) above. Such a configuration allows optimizing retardation conditions not only for green light around the wavelength 550 nm, but also for blue light around the wavelength 450 nm and red light around the wavelength 650 nm, and allows providing a high-contrast ratio, high-quality LCD device that is free of coloring during black display, over a wide viewing angle range. The LCD device of the present invention is not limited to an embodiment in which the in-plane slow axis of the retardation film is perfectly orthogonal, in a plan view of the display surface, to the absorption axis of the polarizer on the same side with respect to the LC cell. So long as a high contrast ratio can be obtained in the front direction, the angle formed by the in-plane slow axis of the retardation film and the absorption axis of the polarizer on the same side with respect to the LC cell, in a plan view of the display surface, may deviate from 90° by about ±1° (more preferably ±0.5°. Blue coloring may occur during black display when R0(B)/R0(G) and/or Rth(B)/Rth(G) exceed 0.965. Also, red coloring may occur during black display when R0(R)/R0(G) and/or Rth(R)/Rth(G) are smaller than 1.015.

The LC cell is a vertical alignment LC cell having a pair of transparent substrates, and provided therebetween, an LC layer and at least blue, green and red color filter layers that separate three respective colors of blue, green and red, such that the LC cell satisfies equations (5) and (6) above. A reverse wavelength dispersion-type biaxial retardation film having comparatively smaller retardation than conventional retardation films can thus be used by optimizing the thickness-direction retardation of the LC cell in the wavelength 450 nm, the wavelength 550 nm and the wavelength 650 nm. The thickness-direction retardation of the LC cell is the sum total of the thickness-direction retardation of all the media between the pair of transparent substrates, including the pair of transparent substrates, i.e. is the thickness-direction retardation measured using the entire LC cell as a sample. When the other constituent members of the LC cell besides the LC layer, namely the transparent substrates, the color filter layers and so forth have also retardation, then the thickness-direction retardation of the LC cell is the sum total including the retardation of the foregoing. In the present description, the term red denotes preferably a color whose dominant wavelength ranges from 620 nm to 680 nm, more preferably a color whose dominant wavelength ranges from 630 nm to 670 nm. The term green denotes preferably a color whose dominant wavelength ranges from 520 nm to less than 580 nm, more preferably a color whose dominant wavelength ranges from 530 nm to 570 nm. The term blue denotes preferably a color whose dominant wavelength ranges from 420 nm to less than 480 nm, more preferably a color whose dominant wavelength ranges from 430 nm to 470 nm. Thus, the LC cell may have a pair of transparent substrates, and sandwiched therebetween, an LC layer as well as a blue color filter layer that transmits (separates) blue, a green color filter layer that transmits (separates) green, and a red color filter layer that transmits (separates) red.

So long as the LCD device of the present invention comprises the above-described constituent elements, the LCD device may also be provided with other members, not particularly limited, as constituent elements.

Preferred embodiments of the LCD device of the present invention are explained in detail below.

The above LCD device may have a first polarizer; a first retardation film; an LC cell; a second retardation film; and a second polarizer having an absorption axis azimuth that is orthogonal, in a plan view of the display surface, to that of the first polarizer, in this order, wherein the first retardation film is a reverse wavelength dispersion-type biaxial retardation film whose in-plane slow axis is orthogonal, in a plan view of the display surface, to the absorption axis of the first polarizer, and such that the first retardation film satisfies equations (1) to (4) above, and wherein the second retardation film is a reverse wavelength dispersion-type biaxial retardation film whose in-plane slow axis is orthogonal, in a plan view of the display surface, to the absorption axis of the second polarizer, and such that the second retardation film satisfies equations (1) to (4) above. Such a configuration allows preventing contrast ratio drops in the front direction, and allows realizing a high contrast ratio, free of coloring, over a wide viewing angle range.

The above LCD device may have (a) a first polarizer; a first retardation film; an LC cell; a second retardation film; and a second polarizer having an absorption axis azimuth that is orthogonal, in a plan view of the display surface, to that of the first polarizer, in this order, wherein the first retardation film is a reverse wavelength dispersion-type biaxial retardation film whose in-plane slow axis is orthogonal, in a plan view of the display surface, to the absorption axis of the first polarizer, and such that the first retardation film satisfies equations (1) to (4) above, and the second retardation film is a negative C plate whose in-plane slow axis is orthogonal or parallel, in a plan view of the display surface, to the absorption axis of the second polarizer, such that the negative C plate satisfies equations (1) to (4) above. Alternatively, the LCD device may have (b) a first polarizer; a first retardation film; an LC cell; a second retardation film; and a second polarizer having an absorption axis azimuth that is orthogonal, in a plan view of the display surface, to that of the first polarizer, in this order, wherein the first retardation film is a reverse wavelength dispersion-type biaxial retardation film whose in-plane slow axis is orthogonal, in a plan view of the display surface, to the absorption axis of the first polarizer, and such that the first retardation film satisfies equations (1) to (4) above, and the second retardation film is a negative C plate whose in-plane retardation is zero and that satisfies equations (2) and (4) above. Such configurations allow preventing contrast ratio drops in the front direction, and allow realizing high contrast ratio, free of coloring, over a wide viewing angle range. The above embodiment (a) is not limited to a configuration wherein the in-plane slow axis of the second retardation film is perfectly orthogonal or parallel, in a plan view of the display surface, to the absorption axis of the second polarizer. So long as a high contrast ratio can be obtained in the front direction, the angle formed by the in-plane slow axis of the second retardation film and the absorption axis of the second polarizer, in a plan view of the display surface, may deviate from 90° by about ±1° (more preferably ±0.5°), in the case of orthogonal axes. In the case of parallel axes, the angle formed by the in-plane slow axis of the second retardation film and the absorption axis of the second polarizer, in a plan view of the display surface, may deviate by about ±1° (more preferably ±0.5°), from perfect parallelism. In the present description, thus, orthogonality between two given axes or directions preferably denotes that the two axes or directions form strictly an angle of 90°, but the angle need not be strictly 90° so long as high contrast ratio can be obtained in the front direction, and thus the two axes or two directions need only be substantially orthogonal. Specifically, the advantageous effect of the present invention can be elicited provided that the angle is within a range of 90±1° (more preferably 90°±0.5°). In the present description, parallelism between two given axes or directions preferably denotes that the two axes or directions form strictly an angle of 0°, but the angle need not be strictly 0° so long as high contrast ratio can be obtained in the front direction, and thus the two axes or two directions need only be substantially parallel. Specifically, the advantageous effect of the present invention can be elicited provided that the angle is within a range of 0°±1° (more preferably 0°±0.5°). In terms of simplifying the manufacturing process and lowering manufacturing costs, a TAC (triacetyl cellulose) film, which is ordinarily used as a protective film of polarizers, is preferably employed as the above second retardation film.

In terms of suppressing blue coloring during black display, the retardation film preferably satisfies $R0(B)/R0(G) \leq 0.965$ (more preferably 0.940). More preferably, $Rth(B)/Rth(G)$ in the retardation film is substantially identical to $R0(B)/R0(G)$, in terms of suppressing blue coloring more effectively during black display by equalizing the biaxial parameter of blue with the biaxial parameter of green. More preferably, the retardation film satisfies $R0(B)/R0(G) \geq 0.818$ in terms of suppressing effectively blue coloring during black display without increasing film thickness. That is because, although the theoretical optimal value of wavelength dispersion in reverse wavelength dispersion-type retardation films is ordinarily $R0(B)/R0(G)=0.818(=450/550)$, the retardation that is brought about in a reverse wavelength dispersion-type retardation film tends to be smaller, and the retardation film thicker, for a smaller $R0(B)/R0(G)$. Herein, a value of 0.828 is preferable to 0.808 for a same deviation of 0.010 from the theoretical optimal value 0.818.

In terms of suppressing red coloring during black display, the retardation film preferably satisfies $R0(R)/R0(G) \geq 1.015$ (more preferably 1.040). More preferably, $Rth(R)/Rth(G)$ in the retardation film is substantially identical to $R0(R)/R0(G)$, in terms of suppressing red coloring more effectively during black display by equalizing the biaxial parameter of red with the biaxial parameter of green. More preferably, the retardation film satisfies $R0(R)/R0(G) \leq 1.181$ in terms of suppressing effectively red coloring during black display without increasing film thickness. That is because, although the theoretical optimal value of wavelength dispersion in reverse wavelength dispersion-type retardation films is ordinarily $R0(R)/R0(G)=1.181(=650/550)$, the retardation that is brought about in a reverse wavelength dispersion-type retardation film tends to be smaller, and the retardation film thicker, for a greater $R0(R)/R0(G)$. Herein, a value of 1.171 is preferable to 1.191 for a same deviation of 0.010 from the theoretical optimal value 1.181.

In terms of suppressing blue coloring during black display, the LC cell satisfies preferably $0.818 \leq Rth\_LC(B)/Rth\_LC(G) \leq 1.000$, more preferably $0.818 \leq Rth\_LC(B)/Rth\_LC(G) \leq 0.965$.

In terms of suppressing red coloring during black display, the LC cell satisfies preferably $1.000 \leq Rth\_LC(R)/Rth\_LC(G) \leq 1.181$, more preferably $1.015 \leq Rth\_LC(R)/Rth\_LC(G) \leq 1.181$.

In the above LCD device, preferably, at least one of the thicknesses $d(R)$, $d(G)$ and $d(B)$ of the LC layer, corresponding to regions where the blue, green and red color filter layers are respectively provided, is different from the others of the thicknesses $d(R)$, $d(G)$ and $d(B)$; more preferably, $d(R)$, $d(G)$ and $d(B)$ are different from each other. Such configurations allow realizing easily an LC cell that satisfies equations (5) and (6) above.

Effect of the Invention

The present invention allows realizing an LCD device having a high contrast ratio, and free of coloring during black display, over a wide viewing angle range.

Best Modes for Carrying out the Invention

The present invention will be explained in detail below on the basis of embodiments, with reference to accompanying drawings. The present invention, however, is not limited to these embodiments alone.

(First Embodiment of the Present Invention)

A first embodiment of the LCD device in which the present invention is used will be explained with reference to FIGS. 1 to 4. FIG. 1 is a cross-sectional schematic diagram illustrating the configuration of an LCD device of a first embodiment of the present invention. FIG. 2 is a diagram for explaining the transition of polarization states in the LCD device of the first embodiment of the present invention, and illustrates a S1-S3 plane in the Poincare sphere. FIG. 3 is a diagram for explaining the transition of polarization states in a conventional LCD device, wherein (a) illustrates an instance of wavelength 450 nm, (b) an instance of wavelength 550 nm, and (c) an instance of wavelength 650 nm. FIG. 4 is a diagram for explaining the transition of polarization states in the LCD device of the first embodiment of the present invention, wherein (a) illustrates an instance of wavelength 450 nm, (b) an instance of wavelength 550 nm, and (c) an instance of wavelength 650 nm.

As illustrated in FIG. 1, the LCD device of the present invention includes a VA LC cell 10; a pair of polarizers 14f, 14r disposed so as to sandwich the LC cell 10; a first biaxial retardation film 15r disposed between the LC cell 10 and the first polarizer 14r; and a second biaxial retardation film 15f disposed between the LC cell 10 and the second polarizer 14f. The first polarizer 14r and the second polarizer 14f are disposed in such a manner that the absorption axes thereof are substantially orthogonal to each other (the angle formed by the axes is within 90°±1°, more preferably within 90°±0.5°) in a plane view of the display surface of the LC cell 10 (cross-Nicol arrangement). A backlight unit (not shown), as a light source, is disposed on the face side that does not oppose the LC cell 11 of the polarizing film 14r. Protective films such as TAC (triacetyl cellulose) films are disposed on respective outer sides of the first polarizer 14r and the second polarizer 14f. The first biaxial retardation film 15r and the second biaxial retardation film 15f may also function as protective films that protect the first polarizer 14r and the second polarizer 14f respectively. Except for the backlight unit, all members are bonded to each other by way of an adhesive or a cohesive. The LC cell 10 includes a first and a second transparent substrate 11r, 11f; and an LC layer 13, interposed between the transparent substrates 11r, 11f, and containing LCs that are vertically aligned with respect to the transparent substrates 11r, 11f. On the transparent substrate 11f there are arranged, in a given order, a blue pixel on which a blue color filter layer 12B is disposed, a green pixel on which a green color filter layer 12G is disposed, and a red pixel in which a red color filter layer 12R is disposed. One pixel includes three mutually adjacent blue, green and red sub-pixels, to enable display of various colors. In the first embodiment of the present invention (FIG. 1), the color filter layers 12B, 12G, 12R are formed on the side of the second transparent substrate 11f, but may be formed on the side of the first transparent substrate 11r.

The various constituent members are explained in detail next.

The LC cell 10 is a vertical alignment LC cell in which black is displayed by aligning the LC molecules in the LC layer 13 vertically with respect to the surface of the transparent substrates 11r, 11f. Examples of LCD modes in which black display is carried out through vertical alignment of LC molecules in the LC layer 13 with respect to the surface of the transparent substrates 11r, 11f include, for instance, TN mode, ECB mode, VA mode and OCB mode. In the present description, the term "VA LC cell" does not always mandate a strict vertical alignment of the LC molecules with respect to a substrate surface, and may denote an LC cell in which the LC molecules are aligned substantially vertically to a substrate surface.

Conventional transparent substrates, for instance glass substrates, may be appropriately used as the transparent substrates 11r, 11f. Likewise, conventional polarizers may be used as the polarizers 14r, 14f, for instance a polyvinyl alcohol (PVA) film with a dichroic anisotropic material such as iodine complex adsorbed and aligned thereon. A conventional LC layer can be used as the LC layer 13, for instance a nematic LC having negative dielectric anisotropy. Vertical alignment can be typically realized by using a VA film (not shown) that includes a polyimide or the like.

The biaxial retardation films 15r, 15f satisfy each the relationship nx>ny>nz, wherein nx and ny (nx>ny) denote the principal refractive indices of the retardation film in the in-plane direction, nz denotes the principal refractive index in the out-of-plane direction, and d denotes the thickness of the retardation film. The biaxial retardation films 15r, 15f are so-called reverse wavelength dispersion-type retardation films, wherein the in-plane retardation R0 of the retardation film is defined as (nx−ny)×d and the thickness-direction retardation Rth of the retardation film is defined as (nz−(nx+ny)/2)×d, and wherein the in-plane retardations R0(B), R0(G) and R0(R) of the retardation film at the wavelength 450 nm, the wavelength 550 nm and the wavelength 650 nm, respectively, and the thickness-direction retardations Rth(B), Rth(G), Rth(R) of the retardation film at the wavelength 450 nm, the wavelength 550 nm and the wavelength 650 nm, respectively, satisfy equations (1) to (4) below. As such reverse wavelength dispersion-type biaxial retardation films there can be used, for instance, modified polycarbonate films having a fluorene backbone, or modified cellulose films in which the degree of acetylation is appropriately controlled. The method for forming the biaxial retardation films 15r, 15f is not particularly limited, and may involve, for instance, solvent casting, melt extrusion or the like for forming a film. A plurality of retardation films may be formed simultaneously through co-extrusion. So long as the desired retardation can be achieved, the retardation films may be unstretched, or may be appropriately stretched. The stretching method is not especially limited. The polymer films may be stretched under tension between rolls, compressed and stretched between rolls, uniaxially stretched in a transverse direction with a tenter, or biaxially stretched in longitudinal and transverse directions. Alternatively, the polymer films may be specially stretched under the influence of contractile force of a thermo-shrinkable film.

$$R0(B)/R0(G) \leq 0.965 \text{ (more preferably 0.940)} \quad (1)$$

$$Rth(B)/Rth(G) \leq 0.965 \text{ (more preferably 0.940)} \quad (2)$$

$$R0(R)/R0(G) \geq 1.015 \text{ (more preferably 1.040)} \quad (3)$$

$$Rth(R)/Rth(G) \geq 1.015 \text{ (more preferably 1.040)} \quad (4)$$

In terms of effectively suppressing coloring during black display without increasing film thickness, the R0(B), R0(G), and R0(R), and Rth(B), Rth(G), and Rth(R) of each biaxial retardation film 15r, 15f satisfy preferably equations (A) to (D) below.

$$R0(B)/R0(G) \geq 0.818 \quad (A)$$

$$Rth(B)/Rth(G) \geq 0.818 \quad (B)$$

$$R0(R)/R0(G) \leq 1.181 \quad (C)$$

$$Rth(R)/Rth(G) \leq 1.181 \quad (D)$$

In terms of suppressing coloring during black display more effectively, Rth(B)/Rth(G) is more preferably substantially identical to R0(B)/R0(G), and Rth(R)/Rth(G) is more preferably substantially identical to R0(R)/R0(G), for each biaxial retardation film 15r, 15f.

The specific conditions of the retardations of the biaxial retardation films 15r, 15f are not particularly limited as long as the effect of improving the viewing angle of the LCD device is exhibited, and appropriate optimal values can be selected in consideration of the below-described thickness-direction retardation Rth_LC of the entire LC cell 10. For instance, a biaxial retardation film having an in-plane retardation R0(G)=55 nm and Rth(G)=−125 nm can be selected for an LC cell having Rth_LC(G)=320 nm. The in-plane slow axis (x-axis direction) of the biaxial retardation film 15r is substantially orthogonal to the absorption axis of the polarizer 14r, in a plan view of the display surface (the angle formed by both axes is set to lie within 90°±1°, more preferably within 90°±0.5°. The in-plane slow axis (x-axis direction) of the biaxial retardation film 15f is substantially orthogonal to the absorption axis of the polarizer 14f, in a plan view of the display surface (the angle formed by both axes is set to lie within 90°±1°, more preferably within 90°±0.5°.

Thus, the "in-plane slow axis of the retardation films" in the present description is the direction (x-axis direction) of the principal dielectric axis corresponding to the principal refractive index nx. The term "optic axis" herein does not represent the optic axis strictly used in crystal optics, and is defined as follows. Assuming that the average value of the three principal refractive indices of the retardation film is calculated and then the difference between each principal refractive index and the average value is calculated, the principal axis which corresponds to the principal refractive index having the maximum absolute value of the difference is the "optic axis" herein. Thus, an optically biaxial retardation film has not two but a single "optic axis." As mentioned here, the "optic axis" of the biaxial retardation film corresponds to the optic axis of the conventional definition when it is optically approximated to a uniaxial retardation film.

Conventional color filter layers can be appropriately used as the color filter layers 12B, 12G, 12R. Herein there can be used, for instance, pigment dispersion color filter layers. The color filter layers 12B, 12G, 12R in the first embodiment of the present invention (FIG. 1) are set in such a manner that (thickness of the blue color filter layer 12B)>(thickness of the green color filter layer 12G)>(thickness of the red color filter layer 12R). Accordingly, the thickness of the LC layer 13 satisfies the relationship (thickness of the LC layer 13 in red pixels)>(thickness of the LC layer 13 in green pixels)>(thickness of the LC layer 13 in blue pixels). As described below, this relationship is established to optimize the wavelength dispersion of the thickness-direction retardation for the LC cell 10 as a whole. So long as the thickness-direction retardation of the LC cell 10 satisfies the relationships of equations (5) and (6) below, the thickness of the LC layer 13 for each color pixel is not limited to the above-mentioned relationships. That is because the optimal thickness of the LC layer 13 varies depending on the retardation, and the wavelength dispersion, of each color filter layer 12B, 12G, 12R, and on the birefringence wavelength dispersion of the LC material that forms the LC layer 13.

$$Rth\_LC(B)/Rth\_LC(G) \leq 1.000 \text{ (more preferably } 0.965) \quad (5)$$

$$Rth\_LC(R)/Rth\_LC(G) \geq 1.000 \text{ (more preferably } 1.015) \quad (6)$$

In equations (5) and (6), Rth_LC(B), Rth_LC(G) and Rth_LC(R) denote, respectively, the thickness-direction retardations of the LC cell 10 at the wavelength 450 nm, the wavelength 550 nm and the wavelength 650 nm. Herein, the thickness-direction retardation is defined as Rth=(nz−(nx+ny)/2)× d, wherein nx, ny (n≧ny) denote the principal refractive indices in the in-plane direction of the medium, nz denotes the principal refractive index in the out-of-plane direction, and d denotes the thickness of the medium. In the present description, the thickness-direction retardation of an LC cell is the sum value of the thickness-direction retardations of all the media between the pair of transparent substrates, including the pair of transparent substrates, i.e. is the thickness-direction retardation measured using the entire LC cell as a sample. Accordingly, when constituent members of the LC cell other than the LC layer, i.e. the transparent substrates, color filter layers and so forth have also retardation, the thickness-direction retardation of the LC cell is a sum value that includes the retardation of the foregoing.

In terms of suppressing coloring more effectively during black display, Rth_LC(B), Rth_LC(G) and Rth_LC(R) preferably satisfy equations (E) and (F) below.

$$Rth\_LC(B)/Rth\_LC(G) \geq 0.818 \quad (E)$$

$$Rth\_LC(R)/Rth\_LC(G) \leq 1.181 \quad (F)$$

In the first embodiment of the present invention, the thickness of the LC layer 13 is adjusted by adjusting the thickness of the color filter layers 12B, 12G, 12R for each color pixel. However, the thickness of the color filter layers 12B, 12G, 12R may be constant for each color pixel, and the thickness of the LC layer 13 may be adjusted by providing a thickness adjustment layer composed of a transparent material, separately from the color filter layers 12B, 12G, 12R. Obviously, the thickness of the LC layer 13 may also be adjusted by setting a dissimilar thickness for the color filter layers 12B, 12G, 12R and also for the thickness adjustment layer, for each color pixel.

Conventional constituent members can be appropriately used as the other constituent members of the LC cell that have been omitted in the drawings and the above explanation, (for instance alignment layers, transparent electrodes, TFT elements, metal wiring and so forth).

An explanation follows next on retardation in the LC cell 10. Research by the inventors has revealed that conventional color filter layers exhibit ordinarily a C plate-type retardation. In C plate-type retardation, the optic axis is in the out-of-plane direction and there is satisfied the relationship nx≈ny≠nz, wherein nx, ny denote the principal refractive indices in the in-plane direction (x direction, y direction), and nz denotes the principal refractive index in the out-of-plane direction (z direction). Birefringence does not occur for light-ray incidence from the z direction, and hence optical characteristics are not influenced when the LCD device is observed from the normal direction. However, birefringence affects optical characteristics when the LCD device is observed from an oblique direction. C plates can be divided into positive C plates and negative C plates according to the positive or negative sign of the value (extraordinary index)−(ordinary index). That is, the C plate is a positive C plate when nx≈ny<nz, and a negative C plate when nx≈ny>nz. Studies by the inventors have revealed that green color filter layers have a strong tendency to become positive C plates, and blue color filter layers and red color filter layers to become negative C plates. For instance, an analysis of dismantled elements of a commercially available LC television A yielded Rth values for the color filter layer, for each wavelength, of Rth(B)=−1 nm, Rth(G)=+14 nm and Rth(R)=−6 nm. An analysis of dismantled elements of another commercially available LC television B yielded Rth values for the color filter layer, for each wavelength, of Rth(B)=−18 nm, Rth(G)=+12 nm and Rth(R)=−8 nm. An analysis of dismantled elements of yet another commercially available LC television C yielded Rth values for the color filter layer, for each wavelength, of Rth (B)=−13 nm, Rth(G)=+7 nm and Rth(R)=−11 nm.

When the alignment state of the LC layer is a vertical alignment, the thickness-direction retardation Rth of the LC layer is expressed as the product Δn×d of the birefringence Δn of the LC and the cell gap d of the LC. In ordinary LC materials, the birefringence of the LC, expressed as Δn(B), Δn(G) and Δn(R), takes on values of Δn(G)=0.09, Δ(B)/Δ(G)=1.05 and Δ(R)/Δ(G)=0.97, at the wavelength 450 nm, the wavelength 550 nm and the wavelength 650 nm, respectively. Therefore, the Rth value of the LC layer in a conventional LC cell manufactured to, for instance, a cell gap d=3.4 μm, is Rth(B)=321.3 nm, Rth(G)=306 nm and Rth(R)=296.82 nm, for the respective wavelengths. For example, in a case where the LC cell has the same color filter layer as used in the above-mentioned LC television A, the values of the thickness-direction retardation Rth_LC of the LC cell, for the respective wavelengths, are Rth_LC(B)=321.3 nm−1 nm=320.3 nm, Rth_LC(G)=306 nm+14 nm=320 nm and Rth_LC(R)=296.82 nm−6 nm=293.82 nm. These values do not satisfy the conditions of equations (5) and (6) as required for achieving the effect of the present invention.

The relative relationship between the thickness-direction retardations Rth_LC(B), Rth_LC(G) and Rth_LC(R) of the LC cell can be adjusted arbitrarily by adjusting the thickness of the LC layer, for each color pixel, through adjustment of the thickness of the color filter layer for each color pixel. For instance, the values of the thickness-direction retardation Rth_LC of the LC cell, for each wavelength, become Rth_LC(B)=302.4 nm−1 nm=301.4 nm, Rth_LC(G)=306 nm+14 nm=320 nm and Rth_LC(R)=340.47 nm−6 nm=334.47 nm by setting the thickness of the LC layer d(B), d(G) and d(R) for the regions at which the blue, green and red color filter layer are provided, to 3.2 μm, 3.4 μm and 3.9 μm, respectively. These values satisfy the conditions of equations (5) and (6) as required for achieving the effect of the present invention.

The advantageous effect of the present invention is explained next by tracking transitions of the polarization state on the Poincare sphere. The concept behind the Poincare sphere is widely known in the field of, for instance, crystal optics, as a method for effectively tracking the polarization state as it changes through a retardation element (see, for instance, Hiroshi Takasaki's "Kessho Kogaku (Crystal Optics)" by Morikita Publishing Co., Ltd., 1975, p. 146-163). On the Poincare sphere, right-handed polarized light is represented on the upper hemisphere, left-handed polarized light is represented on the lower hemisphere, linearly polarized light is represented on the equator, and right-handed circularly polarized light and left-handed circularly polarized light are represented on the upper and lower poles, respectively. Two polarization states having a symmetric relationship with respect to the center of the sphere have the same absolute value of ellipticity angle but opposite polarities, and thus form an orthogonal polarized light pair. The effect of the retardation film on the Poincare sphere is to convert a point that represents the polarization state immediately before passage through the retardation film, into a point rotationally shifted, about the slow axis on the Poincare sphere, by an angle that is determined by (2π)×(retardation)/(wavelength) (units in rad). In the case of observation from an oblique direction, the rotation center and rotation angle are determined by the slow axis and the retardation at that observation angle. Without going into a detailed explanation, the rotation center and the rotation angle can be calculated by working out a vibration direction in the eigenmode of vibration and a wave vector in the retardation film, for instance by solving Fresnel equation for the normal incidence. The slow axis in the case of observation in an oblique direction depends on the observation angle and on the biaxial parameter NZ, which is defined as (nx−nz)/(nx−ny)(=Rth/R0+0.5), and the retardation in the case of observation in an oblique direction depends on the observation angle, the biaxial parameter NZ, and R0 or Rth. That is, the rotation center (slow axis) is the same for an identical biaxial parameter NZ. The rotation angle (retardation) is considered to be proportional to R0 or Rth.

An instance will be assumed in which the LCD device of the first embodiment of the present invention is observed from a direction that is tilted by 60° (hereafter, polar angle 60°) relative to the azimuth (hereafter, azimuth angle 45°) that bisects the absorption axis azimuths of the first polarizer 14$r$ and the second polarizer 14$f$. The polarization state of the light emitted by the backlight, immediately after having passed through the first polarizer 14$r$, is located at point P0 of the Poincare sphere, and does not coincide with the polarization state that can be absorbed by the second polarizer 14$f$, represented by point E, i.e. does not coincide with the extinction position of the second polarizer 14$f$. This situation is illustrated in FIG. 2 on the S1-S3 plane of the Poincare sphere. The points that indicate the respective polarization states are actually on the surface of the Poincare sphere, but are depicted in the figure as projected on the S1-S3 plane. For simplicity, the absorptions and interfacial reflection of the various optical elements have been disregarded. The Δn of the retardation films 15$r$, 15$f$ (typically, 0.0001 to 0.1) was assumed to be sufficiently small with respect to the average refractive index (1.4 to 1.6) of a retardation film.

Point P0 and point E that would overlap in the case (not shown) of front direction observation overlap no longer upon observation in the oblique direction having an azimuth angle of 45° and a polar angle of 60°. Therefore, light leakage would occur upon observation in the oblique direction if the LC cell 10 and the retardation films 15$r$, 15$f$ were absent. The situation, however, is different in that the LC cell 10 and retardation films 15$r$, 15$f$ are actually present. Firstly, upon passage through the first biaxial retardation film 15$r$, the polarization state at point P0 shifts to point P1, as a result of a rotational transform by a predetermined angle about the slow axis of the first biaxial retardation film 15$r$, represented by point B1 on the Poincare sphere. Upon passage through the LC cell 10 next, the polarization state shifts to point P2, as a result of a rotational transform by a predetermined angle about the slow axis of the LC cell 10, represented by the axis S1 on the Poincare sphere. Lastly, upon passage through the second biaxial retardation film 15$f$, the polarization state shifts finally to point P3, which overlaps with point E, as a result of a rotational transform by a predetermined angle about the slow axis of the second biaxial retardation film 15$f$, represented by pointB2 on the Poincare sphere. In the LCD device of the first embodiment of the present invention, thus, light from the backlight can be blocked, in the same way as in the front direction, for observation at an azimuth angle of 45° and a polar angle of 60°. The explanation of polarization states on the above-described Poincare sphere deals fundamentally with monochromatic light of specific wavelength (ordinarily, a wavelength of about 550 nm). In the concept of the Poincare sphere, as explained above, the variation (the length of the arrows in the figure, more accurately the rotation angle thereof) in the polarization state as a result of retardation by a retardation film is determined by (2π)×(retardation)/(wavelength) (units in rad). Therefore, the retardation required for achieving the same variation in polarization state differs depending on the wavelength. Specifically, a greater retardation is required for longer wavelengths.

In other words, the variation in polarization state is different for each wavelength when not using a retardation film and LC cell that yield greater retardation as the wavelength becomes longer. For instance, when using a retardation film and LC cell optimally designed for green monochromatic light at the wavelength 550 nm, the green light of wavelength 550 nm is converted to point P3 that overlaps with point E, but other light, for instance blue light of wavelength 450 nm or red light of wavelength 650 nm, change to a point P3 that differs from point E, as illustrated in FIGS. 3($a$) to 3($c$). Blue and red light leakage occurs as a result, which gives rise to the known problem of coloring during black display in conventional LCD devices.

In the LCD device of the first embodiment of the present invention, by contrast, the retardation films 15$r$, 15$f$ and the LC cell 10 satisfy equations (1) to (6), as described above, and hence blue light of wavelength 450 nm and red light of wavelength 650 nm are converted also to point P3 that overlaps with point E, as illustrated in FIGS. 4($a$) to 4($c$), as in the case of green light of wavelength 550 nm, which is converted to point P3 that overlaps with point E. Coloring-free high-quality black display can be achieved as a result. Although the most ideal wavelength dispersion characteristic of retardation films and the LC cell is (retardation)∝(wavelength), research by the inventors has revealed that coloring-free high-quality black display can be achieved when equations (1) to (6) above are satisfied.

(Second Embodiment of the Present Invention)

A second embodiment of the LCD device in which the present invention is used will be explained with reference to FIGS. 5 to 7. FIG. 5 is a cross-sectional schematic diagram illustrating the configuration of an LCD device of a second embodiment of the present invention. FIG. 6 is a diagram for explaining the transition of polarization states in the LCD device of the second embodiment of the present invention, and illustrates a S1-S3 plane in the Poincare sphere. FIG. 7 is a diagram for explaining the transition of polarization states in the LCD device of the second embodiment of the present invention, wherein (a) illustrates an instance of wavelength 450 nm, (b) an instance of wavelength 550 nm, and (c) an instance of wavelength 650 nm.

As illustrated in FIG. 5, the LCD device of the present invention includes a VA LC cell 20; a pair of polarizers 24$f$, 24$r$ disposed so as to sandwich the LC cell 20; a biaxial retardation film 25$r$ disposed between the LC cell 20 and one polarizer 14$r$; and a TAC (triacetyl cellulose) film 26$f$ disposed between the LC cell 20 and the second polarizer 24$f$. The first polarizer 24$r$ and the second polarizer 24$f$ are disposed in such a manner that the absorption axes thereof are substantially orthogonal to each other (the angle formed by the axes is within 90°±1°, more preferably within 90°±0.5°) in a plane view of the display surface of the LC cell 20 (cross-Nicol arrangement). A backlight unit (not shown), as a light source, is disposed on the face side of that does not oppose the LC cell 20 of the polarizing film 24$r$. Protective films such as TAC (triacetyl cellulose) films are disposed on respective outer sides of the first polarizer 24$r$ and the second polarizer 24$f$. The first biaxial retardation film 25$r$ and the TAC film 26$f$ may also function as protective films that protect the first polarizer 24$r$ and the second polarizer 24$f$. Except for the backlight unit, all members are bonded to each other by way of an adhesive or a cohesive. The LC cell 20 includes a first and a second transparent substrate 21$r$, 21$f$; and an LC layer 23, interposed between the transparent substrates 21$r$, 21$f$, and including LCs that are vertically aligned with respect to the transparent substrates 21$r$, 21$f$. On the transparent substrate 21$f$ there are arranged, in a given order, a red pixel on which a blue color filter layer 22B is disposed, a green pixel on which a green color filter layer 22G is disposed, and a red pixel in which a red color filter layer 22R is disposed. One pixel includes three mutually adjacent blue, green and red sub-pixels, to enable display of various colors. In the second embodiment of the present invention (FIG. 5), the color filter layers 22B, 22G, 22R are formed on the side of the second transparent substrate 21$f$, but may be formed on the side of the first transparent substrate 21$r$.

The various constituent elements are explained in detail below. Except for the biaxial retardation film 25$r$ and the TAC film 26$f$, other constituents are completely identical to those of the first embodiment, and an explanation thereof will be omitted. For instance, an LC cell exactly identical to the LC cell 10 of the first embodiment can be used as the LC cell 20 of the second embodiment of the present invention. Also, polarizers exactly identical to the polarizers 14$f$, 14$r$ of first embodiment of the present invention can be respectively used as the polarizers 24$f$, 24$r$ of the second embodiment of the present invention. The same is true of other members.

The relationship nx>ny>nz holds in the biaxial retardation film 25$r$, wherein nx, ny(nx>ny) denote the principal refractive indices in the in-plane direction of the retardation film, nz denotes the principal refractive index in the out-of-plane direction, and d denotes the thickness of the retardation film. The biaxial retardation film 25$r$ is a so-called reverse wavelength dispersion-type retardation film, wherein the in-plane retardation R0 of the retardation film is defined as (nx−ny)×d and the thickness-direction retardation Rth of the retardation film is defined as (nz−(nx+ny)/2)×d, and wherein the in-plane retardations R0(B), R0(G) and R0(R) for the wavelength 450 nm, the wavelength 550 nm and the wavelength 650 nm, respectively, and the thickness-direction retardations Rth(B), Rth(G), Rth(R) of the retardation film at the wavelength 450 nm, the wavelength 550 nm and the wavelength 650 nm, respectively, satisfy equations (1) to (4) above (equations (1) to (4) in the first embodiment). As such a reverse wavelength dispersion-type biaxial retardation film there can be used, for instance, a modified polycarbonate film having a fluorene backbone, or a modified cellulose film in which the degree of acetylation is appropriately controlled. The method for forming the biaxial retardation film 25$r$ is not particularly limited, and may involve, for instance, solvent casting, melt extrusion or the like for forming a film. A plurality of retardation films may be formed simultaneously through co-extrusion. So long as the desired retardation can be achieved, the retardation film may be unstretched, or may be appropriately stretched. The stretching method is not especially limited. The polymer films may be stretched under tension between rolls, compressed and stretched between rolls, uniaxially stretched in a transverse direction with a tenter, or biaxially stretched in longitudinal and transverse directions. Alternatively, the polymer films may be specially stretched under the influence of contractile force of a thermo-shrinkable film.

In terms of effectively suppressing coloring during black display without increasing film thickness, the R0(B), R0(G), and R0(R), and Rth(B), Rth(G), and Rth(R) of the biaxial retardation film 25$r$ satisfy preferably equations (A) to (D) above (equations (A) to (D) in the first embodiment).

In terms of more effectively suppressing coloring during black display, Rth(B)/Rth(G) is more preferably substantially identical to R0(B)/R0(G), and more preferably Rth(R)/Rth(G) is substantially identical to R0(R)/R0(G), in the biaxial retardation film 25$r$.

The TAC film 26$f$ is a so-called negative C plate in which there holds the relationship nx=ny (or nx≈ny)>nz, in which nx, ny denote the principal refractive indices in the in-plane direction, nz denotes the principal refractive index in the out-of-plane direction, and d denotes the film thickness. Thus, the TAC film 26$f$ functions as a protective film and also as a retardation film.

The specific conditions of the retardation of the biaxial retardation film 25$r$ are not particularly limited as long as the effect of improving the viewing angle of the LCD device is exhibited, and appropriate optimal values can be selected in consideration of the thickness-direction retardation Rth_LC of the entire LC cell 20, and the thickness-direction retardation Rth of the TAC film 26$f$. For instance, a biaxial retardation film having an in-plane retardation R0(G)=65 nm and Rth(G)=−225 nm can be used for an LC cell having Rth_LC (G)=320 nm and a TAC film having Rth(G)=−50 nm. The in-plane slow axis (x-axis direction) of the biaxial retardation film 25$r$ is substantially orthogonal to the absorption axis of the polarizer 24$r$, in a plan view of the display surface (the angle formed by both axes is set to lie within 90°±1°, more preferably within 90°±0.5°. Preferably, the in-plane retardation R0(G) of the TAC film 26$f$ is zero, but studies by the inventors have showed that the same effect can be elicited as when the in-plane retardation is zero, provided that the in-plane retardation is no greater than 10 nm. If the in-plane retardation R0(G) of the TAC film 26$f$ is not zero, the in-plane slow axis (x-axis direction) of the TAC film 26$f$ and the absorption axis of the polarizer 24$f$ are preferably substantially orthogonal (the angle formed by the axes is within 90°±1°, more preferably within 90°±0.5°, or substantially parallel (the angle formed by the axes is within 0°±1°, more preferably within 0°±0.5°, in a plane view of the display surface.

Conventional color filter layers can be appropriately used as the color filter layers 22B, 22G, 22R. Herein there can be used, for instance, pigment dispersion color filter layers. The color filter layers 22B, 22G, 22R in the second embodiment of the present invention (FIG. 5) are set in such a manner that (thickness of the blue color filter layer 22B)>(thickness of the green color filter layer 22G)>(thickness of the red color filter layer 22R). Accordingly, the thickness of the LC layer 23 satisfies the relationship (thickness of the LC layer 23 in red pixels)>(thickness of the LC layer 23 in green pixels)>(thickness of the LC layer 23 in blue pixels). As described below, this relationship is established to optimize the wavelength dispersion of the thickness-direction retardation for the LC cell 20 as a whole. So long as the thickness-direction retardation of the LC cell 20 satisfies the relationships of equations (5) and (6) above (equations (5) and (6) in the first embodiment), the thickness of the LC layer 23 for each color pixel is not limited to the above-mentioned relationships. That is because the optimal thickness of the LC layer 23 varies depending on the retardation, and the wavelength dispersion, of each color filter layer 22B, 22G, 22R, and on the birefringence wavelength dispersion of the LC material that forms the LC layer 23.

In terms of suppressing coloring more effectively during black display, Rth_LC(B), Rth_LC(G) and Rth_LC(R) preferably satisfy equations (E) and (F) above (equations (E) and (F) in the first embodiment).

The advantageous effect of the present invention is explained next by tracking transitions of the polarization state on the Poincare sphere. An instance will be assumed in which the LCD device of the second embodiment of the present invention is observed from an oblique direction having an azimuth angle of 45° and a polar angle of 60°. The polarization state of the light emitted by the backlight, immediately after having passed through the first polarizer 24r, is located at point P0 of the Poincare sphere, and does not coincide with the polarization state that can be absorbed by the second polarizer 24f, represented by point E, i.e. does not coincide with the extinction position of the second polarizer. This situation is illustrated in FIG. 6 on the S1-S3 plane of the Poincare sphere. The points that indicate the respective polarization states are actually on the surface of the Poincare sphere, but are depicted in the figure as projected on the S1-S3 plane. For simplicity, the absorptions and interfacial reflection of the various optical elements have been disregarded. The Δn of the biaxial retardation film 25r and the TAC film 26f (typically, 0.0001 to 0.1) was assumed to be sufficiently small with respect to the average refractive index (1.4 to 1.6) of the retardation film and the TAC film.

Point P0 and point E that would overlap in the case (not shown) of front direction observation overlap no longer upon observation in the oblique direction having an azimuth angle of 45° and a polar angle of 60°. Therefore, light leakage would occur upon observation in the oblique direction if the LC cell 20 and the retardation film 25r were absent. The situation, however, is different in that the LC cell 20 and the retardation film 25r are actually present. Firstly, upon passage through the biaxial retardation film 25r, the polarization state at point P0 shifts to point P1, as a result of a rotational transform by a predetermined angle about the slow axis of the biaxial retardation film 25r, represented by point B1 on the Poincare sphere. Upon passage through the LC cell 20 next, the polarization state shifts to point P2, as a result of a rotational transform by a predetermined angle about the slow axis of the LC cell 20, represented by the axis S1 on the Poincare sphere. Lastly, upon passage through the TAC film 26f, the polarization state shifts finally to point P3, which overlaps with point E, as a result of a rotational transform by a predetermined angle about the slow axis of the LC cell 20, represented by the axis S1 on the Poincare sphere. In the LCD device of the second embodiment of the present invention, thus, light from the backlight can be blocked, in the same way as in the front direction, for observation at an azimuth angle of 45° and a polar angle of 60°.

In the LCD device of the second embodiment of the present invention, the biaxial retardation film 25r and the LC cell 20 satisfy the relationships (1) to (6) above (equations (1) to (6) in the first embodiment). Therefore, blue light of wavelength 450 nm and red light of wavelength 650 nm are converted both to point P2, as illustrated in FIGS. 7(a) to (c), as in the case of green light of wavelength 550 nm, which is converted to point P2. Even if the last conversion by the TAC film 26f elicits a dissimilar amount of polarization conversion for each wavelength, the difference in the variation would be small nonetheless vis-à-vis the entire conversion amount. Blue light of wavelength 450 nm and red light of wavelength 650 nm are converted both to point P2 that overlaps substantially with point E, as illustrated in FIGS. 7(a) to (c), as in the case of green light of wavelength 550 nm, which is converted to point P3 that overlaps with point E. Coloring-free high-quality black display can be achieved as a result. Although the most ideal wavelength dispersion characteristic of retardation films and the LC cell is (retardation)∝(wavelength), research by the inventors has revealed that coloring-free high-quality black display can be achieved when equations (1) to (6) above are satisfied. The same research has revealed that, more preferably, the in-plane retardation R0 and thickness-direction retardation Rth of the TAC film 26f satisfy the relationships of equations (1) to (4) above, wherein the in-plane retardation R0 of the retardation film is defined as (nx−ny)×d and the thickness-direction retardation Rth of the retardation film is defined as (nz−(nx+ny)/2)×d. TAC films that are commonly used as a protective film of polarizers are so-called reverse wavelength dispersion films that satisfy the relationships of equations (1) to (4) above.

The present invention will be explained in more detail below by way of Examples. The present invention, however, is not limited to these Examples alone.

EXAMPLE 1

Example 1 corresponds to the actual manufacture of an LCD device identical to that of the first embodiment of the present invention. Table 1 summarizes the various optical parameters (retardations and wavelength dispersions thereof) of the LCD device, together with those of Example 2.

EXAMPLE 2

Example 2 corresponds to the actual manufacture of an LCD device identical to that of the second embodiment of the present invention.

COMPARATIVE EXAMPLE 1

In the LCD device of Comparative Example 1 there was manufactured the same LCD device as in Example 1, except that herein the material of the retardation film was changed, and the wavelength dispersion characteristic of retardation was likewise changed. Table 2 summarizes the various optical parameters (retardations and wavelength dispersions thereof) of Comparative Example 1, together with those of other Comparative Examples.

COMPARATIVE EXAMPLE 2

In the LCD device of Comparative Example 2 there was manufactured the same LCD device as in Example 1, except that herein the cell gap of the LC cell was changed, and the wavelength dispersion characteristic of retardation was likewise changed.

COMPARATIVE EXAMPLE 3

In the LCD device of Comparative Example 3 there was manufactured the same LCD device as in Example 2, except that herein the cell gap of the LC cell was changed, and the wavelength dispersion characteristic of retardation was likewise changed.

COMPARATIVE EXAMPLE 4

FIG. 8 is a cross-sectional schematic diagram illustrating the configuration of an LCD device of Comparative Example 4. The LCD device in Comparative Example 4, such as the one illustrated in FIG. 8, was manufactured with reference to Example 9 in Patent Document 6. As illustrated in FIG. 8, the LCD device of Comparative Example 4 includes a vertical alignment LC cell 30; a pair of polarizers 34f, 34r disposed so as to sandwich the LC cell 30; a negative C plate 35r disposed between the LC cell 30 and the first polarizer 34r; and a positive A plate 36f disposed between the LC cell 30 and the second polarizer 34f. A backlight unit (not shown), as a light source, is disposed on the face side that does not oppose the LC cell 20 of the polarizing film 34r. The first polarizer 34r and the second polarizer 34f are disposed so that the absorption axes thereof are substantially orthogonal to each other.

The positive A plate 36f is disposed in such a manner that the slow axis thereof is substantially orthogonal to the absorption axis of the second polarizer 34f. The thickness of the color filter layer (LC cell gap) is identical for all colors.

Evaluation (Measuring Method of in-Plane Retardation R0 and Thickness-Direction Retardation Rth)

Measurements were carried out using a dual-rotating retarder polarimeter (product name: Axo-scan, by Axometrics, Inc.). R0 was actually measured in the normal direction of the retardation film. To calculate Rth, the retardation was measured in the normal direction of the retardation films and the LC cell, and also from an oblique direction, tilted by an angle $\Theta$ ($\Theta=0°$ to $50°$) with respect to the normal direction. Rth was calculated then by curve fitting in accordance with a known optical indicatrix scheme. The oblique azimuth was set to be orthogonal to the in-plane slow axis.

(Measuring Method of Viewing Angle Dependence of Contrast of LCD Device)

The measurements were carried out using a viewing angle measuring instrument (product name: Ez Contrast 160, by ELDIM). As the light source there was used a backlight installed in a commercially available LC television (LC-42GX3W, by Sharp Corporation). Brightnesses upon displaying a white screen and a black screen were measured in an oblique direction having an azimuth angle of 45° and a polar angle of 60°. The ratio thereof was retarded as CR (45, 60).

(Measuring Method of Viewing Angle Dependence of Chromaticity of LCD Device)

The measurements were carried out using a viewing angle measuring instrument (product name: Ez Contrast 160, by ELDIM). As the light source there was used a backlight installed in a commercially available LC television (LC-42GX3W, by Sharp Corporation). There were measured a u'v' chromaticity point for black display in the front direction (polar angle)0° and a u'v' chromaticity point for black display in an oblique direction having an azimuth angle of 45° and a polar angle of 60°. The distance between the two points was $\Delta E$ (45, 60).

Evaluation Results

Tables 1 and 2 summarize the measurement results of the optical parameters (retardation and wavelength dispersion thereof), as well as contrast viewing angle and chromaticity viewing angle for the respective Examples and Comparative Examples. The evaluation results of Tables 1 and 2 show that the LCD devices of Examples 1 and 2 of the present invention exhibited superior display performance, namely equal or higher CR (45, 60) and smaller $\Delta E$ (45, 60), than the conventional LCD devices of Comparative Examples 1 to 3. The results also show that the LCD devices of Examples 1 and 2 of the present invention exhibited similar display performance as that of the conventional LCD device of Example 4, despite the small required retardation in the reverse wavelength dispersion retardation film. It was thus found that the present invention allows providing a high-contrast ratio, high-quality LCD device free of coloring during black display, over a wide viewing angle range, while reducing the required retardation in a reverse wavelength dispersion retardation film, which is difficult to manufacture.

TABLE 1

| | | Example 1 | | | Example 2 | | |
|---|---|---|---|---|---|---|---|
| | | B | G | R | B | G | R |
| Retardation film on second polarizer side LC cell | R0(nm) | 52.7 | 55.1 | 56.2 | 3.91 | 5.10 | 5.88 |
| | R0/R0(G) | 0.956 | 1.000 | 1.020 | 0.767 | 1.000 | 1.153 |
| | Rth(nm) | 120 | 125 | 128 | 42.1 | 55.7 | 62.0 |
| | Rth/Rth(G) | 0.960 | 1.000 | 1.024 | 0.756 | 1.000 | 1.113 |
| | $\Delta$n of LC layer | 0.095 | 0.090 | 0.087 | 0.095 | 0.090 | 0.087 |
| | Cell gap d(µm) | 3.2 | 3.4 | 3.9 | 3.2 | 3.4 | 3.9 |
| | Rth of LC layer (nm) | 302 | 306 | 340 | 302 | 306 | 340 |
| | Rth of CF and so forth (nm) | −1 | 14 | −6 | −2 | 15 | −10 |
| | Total Rth(nm) | 301 | 320 | 334 | 300 | 321 | 330 |
| | Rth/Rth(G) | 0.942 | 1.000 | 1.045 | 0.936 | 1.000 | 1.030 |
| Retardation film on first polarizer side | R0(nm) | 52.7 | 55.1 | 56.2 | 62.2 | 65.2 | 67.2 |
| | R0/R0(G) | 0.956 | 1.000 | 1.020 | 0.954 | 1.000 | 1.031 |
| | Rth(nm) | 120 | 125 | 128 | 216 | 225 | 230 |
| | Rth/Rth(G) | 0.960 | 1.000 | 1.024 | 0.960 | 1.000 | 1.022 |
| Evaluation results | CR(45, 60) | | 82 | | | 75 | |
| | $\Delta$E(45, 60) | | 0.015 | | | 0.010 | |

TABLE 2

| | | Comparative Example 1 | | | Comparative Example 2 | | |
|---|---|---|---|---|---|---|---|
| | | B | G | R | B | G | R |
| Retardation film on second polarizer side LC cell | R0(nm) | 55.6 | 55.0 | 54.5 | 52.7 | 55.1 | 56.2 |
| | R0/R0(G) | 1.010 | 1.000 | 0.990 | 0.956 | 1.000 | 1.020 |
| | Rth(nm) | 126 | 125 | 124 | 120 | 125 | 128 |
| | Rth/Rth(G) | 1.010 | 1.000 | 0.990 | 0.960 | 1.000 | 1.024 |
| | $\Delta$n of LC layer | 0.095 | 0.090 | 0.087 | 0.095 | 0.090 | 0.087 |
| | Cell gap d(µm) | 3.2 | 3.4 | 3.9 | 3.4 | 3.4 | 3.4 |
| | Rth of LC layer (nm) | 302 | 306 | 340 | 321 | 306 | 297 |
| | Rth of CF and so forth (nm) | −2 | 15 | −10 | −3 | 15 | −9 |
| | Total Rth(nm) | 300 | 321 | 330 | 318 | 321 | 288 |
| | Rth/Rth(G) | 0.936 | 1.000 | 1.030 | 0.992 | 1.000 | 0.897 |

TABLE 2-continued

|  |  |  |  |  |  |  |  |
|---|---|---|---|---|---|---|---|
| Retardation film on first polarizer side | RO(nm) | 55.6 | 55.0 | 54.5 | 52.7 | 55.1 | 56.2 |
|  | RO/ROC(G) | 1.010 | 1.000 | 0.990 | 0.956 | 1.000 | 1.020 |
|  | Rth(nm) | 126 | 125 | 124 | 120 | 125 | 128 |
|  | Rth/Rth(G) | 1.010 | 1.000 | 0.990 | 0.960 | 1.000 | 1.024 |
| Evaluation results | CR(45, 60) |  | 72 |  |  | 70 |  |
|  | ⊿E(45, 60) |  | 0.062 |  |  | 0.058 |  |

|  |  | Comparative Example 3 | | | Comparative Example 4 | | |
|---|---|---|---|---|---|---|---|
|  |  | B | G | R | B | G | R |
| Retardation film on second polarizer side | RO(nm) | 3.91 | 5.10 | 5.88 | 122 | 135 | 142 |
|  | RO/RO(G) | 0.767 | 1.000 | 1.153 | 0.900 | 1.000 | 1.050 |
|  | Rth(nm) | 42.1 | 55.7 | 62.0 | 69.8 | 77.5 | 81.4 |
|  | Rth/Rth(G) | 0.756 | 1.000 | 1.113 | 0.900 | 1.000 | 1.050 |
| LC cell | ⊿n of LC layer | 0.095 | 0.090 | 0.087 | 0.095 | 0.090 | 0.087 |
|  | Cell gap d(μm) | 3.4 | 3.4 | 3.4 | 3.4 | 3.4 | 3.4 |
|  | Rth of LC layer (nm) | 321 | 306 | 297 | 321 | 306 | 297 |
|  | Rth of CF and so forth (nm) | −3 | 15 | −9 | −3 | 15 | −9 |
|  | Total Rth(nm) | 318 | 321 | 288 | 318 | 321 | 288 |
|  | Rth/Rth(G) | 0.992 | 1.000 | 0.897 | 0.992 | 1.000 | 0.897 |
| Retardation film on first polarizer side | RO(nm) | 62.2 | 65.2 | 67.2 | 0 | 0 | 0 |
|  | RO/ROC(G) | 0.954 | 1.000 | 1.031 | — | — | — |
|  | Rth(nm) | 216 | 225 | 230 | 201 | 190 | 184 |
|  | Rth/Rth(G) | 0.960 | 1.000 | 1.022 | 1.060 | 1.000 | 0.970 |
| Evaluation results | CR(45, 60) |  | 67 |  |  | 79 |  |
|  | ⊿E(45, 60) |  | 0.051 |  |  | 0.015 |  |

The present application claims priority to Patent Application No. 2008-64102 filed in Japan on Mar. 13, 2008 under the Paris convention and provisions of national law in a designated State, the entire contents of which are hereby incorporated by reference.

BRIEF DESCRIPTION OF DRAWINGS

FIG. 1 is a cross-sectional schematic diagram illustrating the configuration of an LCD device of a first embodiment of the present invention.

FIG. 2 is a diagram for explaining the transition of polarization states in the LCD device of the first embodiment of the present invention, and illustrates a S1-S3 plane in the Poincare sphere.

FIG. 3 is a diagram for explaining the transition of polarization states in a conventional LCD device, wherein (a) illustrates an instance of wavelength 450 nm, (b) an instance of wavelength 550 nm, and (c) an instance of wavelength 650 nm.

FIG. 4 is a diagram for explaining the transition of polarization states in the LCD device of the first embodiment of the present invention, wherein (a) illustrates an instance of wavelength 450 nm, (b) an instance of wavelength 550 nm, and (c) an instance of wavelength 650 nm.

FIG. 5 is a cross-sectional schematic diagram illustrating the configuration of an LCD device of a second embodiment of the present invention.

FIG. 6 is a diagram for explaining the transition of polarization states in the LCD device of the second embodiment of the present invention, and illustrates a S1-S3 plane in the Poincare sphere.

FIG. 7 is a diagram for explaining the transition of polarization states in the LCD device of the second embodiment of the present invention, wherein (a) illustrates an instance of wavelength 450 nm, (b) an instance of wavelength 550 nm, and (c) an instance of wavelength 650 nm.

FIG. 8 is a cross-sectional schematic diagram illustrating the configuration of an LCD device of Comparative Example 4.

Figure 1:
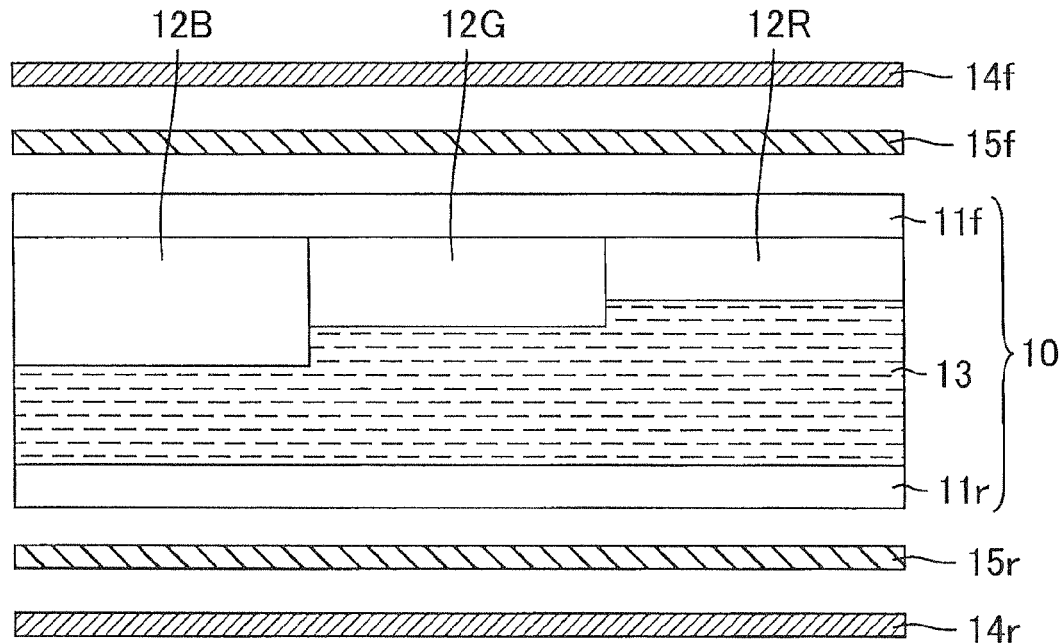
[FIG. 1]
Figure 2:
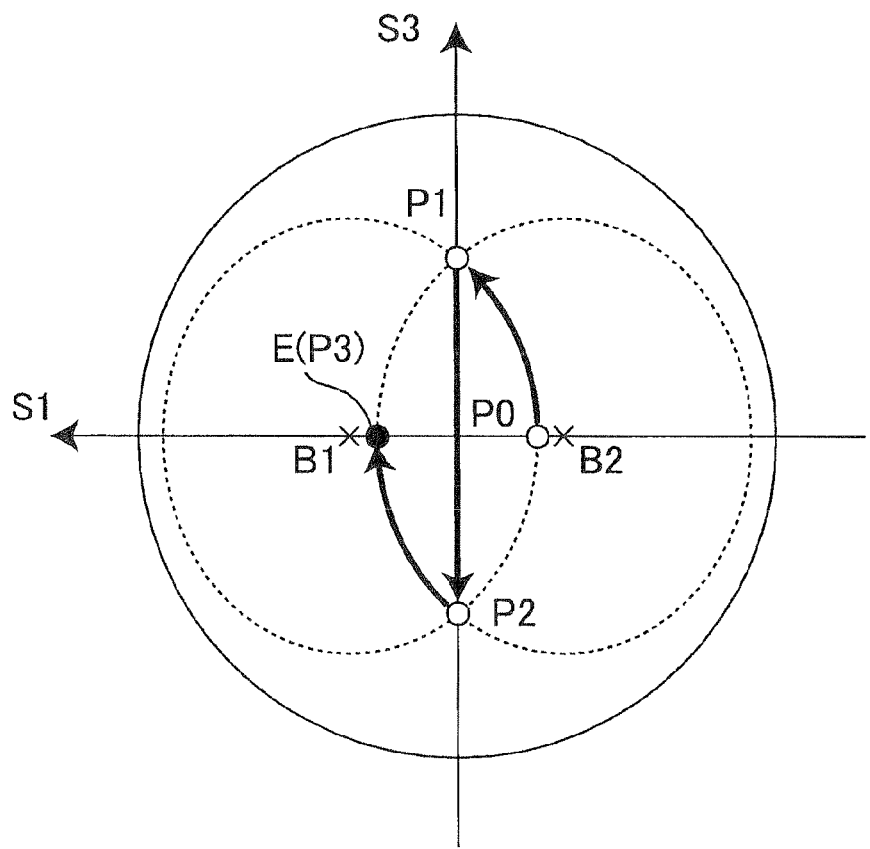
[FIG. 2]
Figure 3:
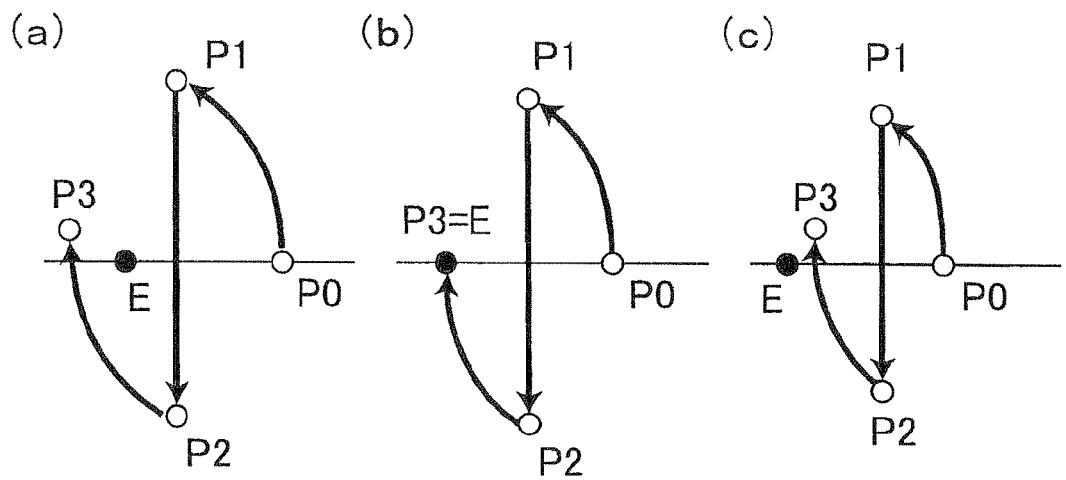
[FIG. 3]
Figure 4:
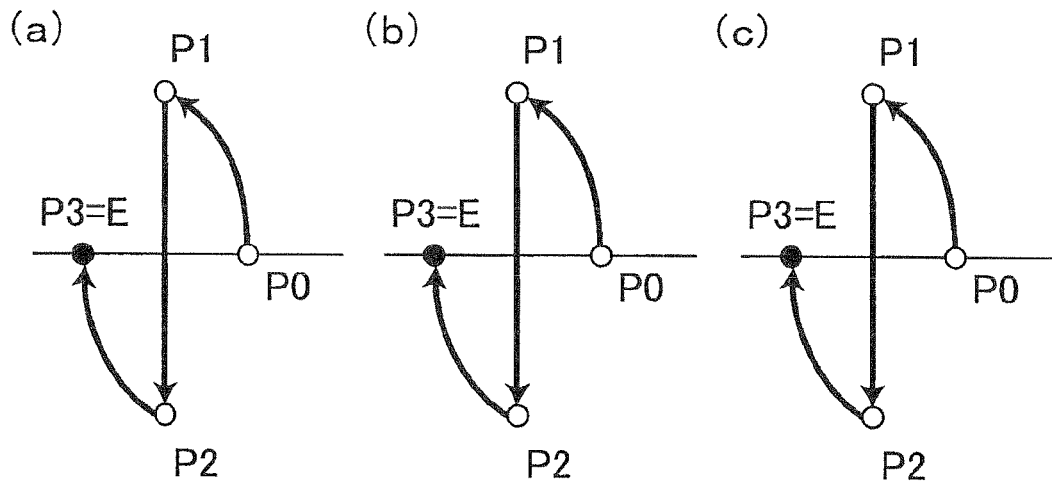
[FIG. 4]
Figure 5:
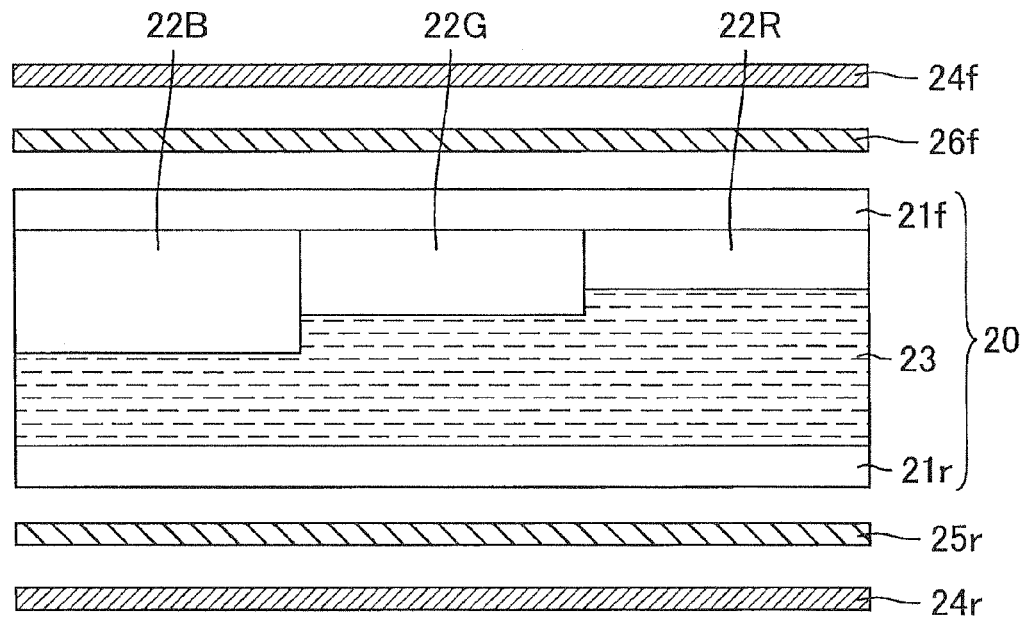
[FIG. 5]
Figure 6:
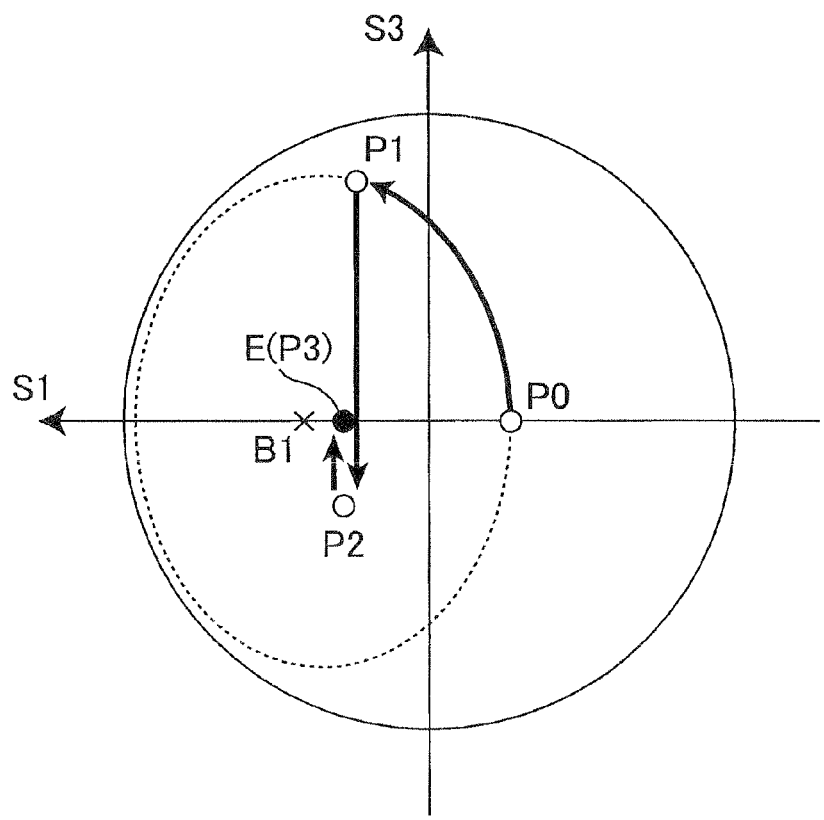
[FIG. 6]
Figure 7:
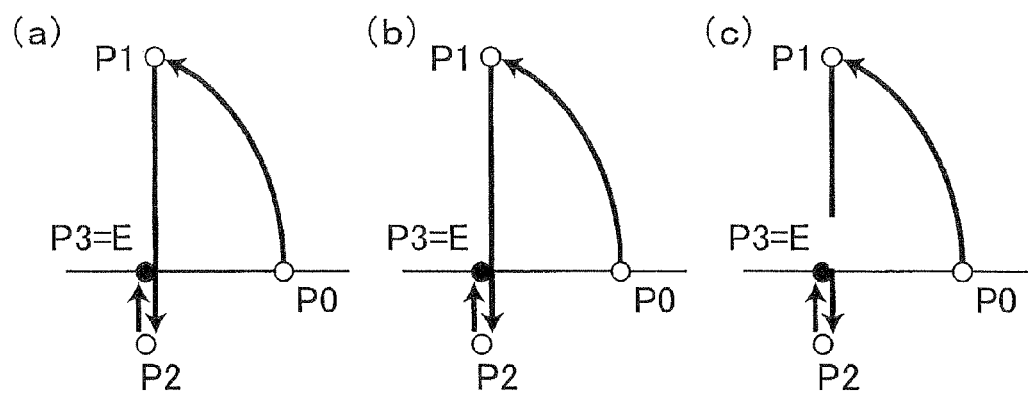
[FIG. 7]
Figure 8:
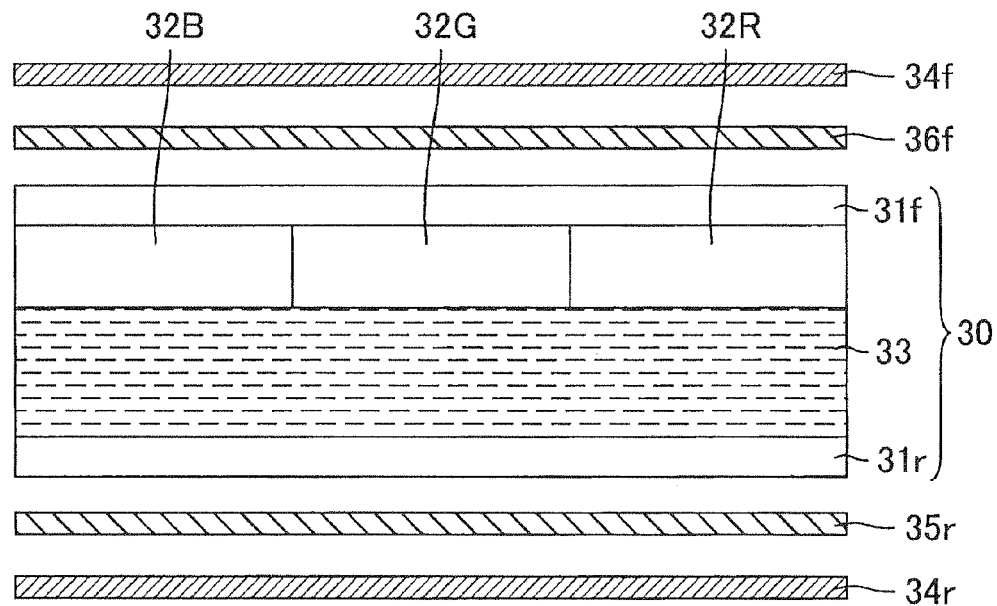
[FIG. 8]

EXPLANATION OF NUMERALS AND SYMBOLS 10, 20, 30: LC cell
11r, 21r, 31r: First transparent substrate
11f, 21f, 31f: Second transparent substrate
12B, 22B, 32B: Blue color filter layer
12G, 22G, 32G: Green color filter layer
12R, 22R, 32R: Red color filter layer
13, 23, 33: LC layer
14r, 24r, 34r: First polarizer
14f, 24f, 34f: Second polarizer
15r, 25r: First biaxial retardation film
15f: Second biaxial retardation film
26f: TAC film
35r: Negative C plate
35f: Positive A plate

The invention claimed is:
1. A liquid crystal display device, comprising:
a first polarizer;
a liquid crystal cell;
a second polarizer having an absorption axis azimuth that is orthogonal, in a plan view of a display surface of the liquid crystal cell, to that of the first polarizer, in this order; and
a retardation film provided at least one of between the first polarizer and the liquid crystal cell, and between the second polarizer and the liquid crystal cell, wherein the retardation film is a reverse wavelength dispersion-type biaxial retardation film having an in-plane slow axis that is orthogonal, in a plan view of the display surface, to an absorption axis of a polarizer on the same side with respect to the liquid crystal cell, and satisfying equations (1) to (4) below, and the liquid crystal cell is a vertical alignment liquid crystal cell having a pair of transparent substrates, and provided therebetween a liquid crystal layer and at least blue, green and red color filter layers that separate three respective colors of blue, green and red, and satisfying equations (5) and (6) below, $$0.956 \leq R0(B)/R0(G) \leq 0.965 \quad (1)$$

$$0.960 \leq Rth(B)/Rth(G) \leq 0.965 \quad (2)$$

$$1.020 \geq R0(R)/R0(G) \geq 1.015 \quad (3)$$

$$1.024 \geq Rth(R)/Rth(G) \geq 1.015 \quad (4)$$

$$0.942 \leq Rth\_LC(B)/Rth\_LC(G) \leq 1.000 \quad (5)$$

$$1.045 \geq Rth\_LC(R)/Rth\_LC(G) \geq 1.000 \quad (6)$$

where in equations (1) to (4), R0(B), R0(G) and R0(R) denote, respectively, the in-plane retardations of the retardation film at wavelengths 450 nm, 550 nm and 650 nm, Rth(B), Rth(G) and Rth(R) denote, respectively, thickness-direction retardations of the retardation film at wavelengths 450 nm, 550 nm and 650 nm, and in equations (5) and (6), Rth_LC(B), Rth_LC(G) and Rth_LC(R) denote, respectively, thickness-direction retardations of the liquid crystal cell at wavelengths 450 nm, 550 nm and 650 nm.

2. The liquid crystal display device according to claim 1, wherein at least one of thicknesses d(R), d(G) and d(B) of the liquid crystal layer, corresponding to regions where the blue, green and red color filter layers are respectively provided, is different from the others of the thicknesses d(R), d(G) and d(B).

3. The liquid crystal display device according to claim 1, wherein the retardation film satisfies at least one of a relationship where Rth(B)/Rth(G) is substantially equal to R0(B)/R0(G) and a relationship where Rth(R)/Rth(G) is substantially equal to R0(R)/R0(G).

4. The liquid crystal display device according to claim 2, wherein the retardation film satisfies at least one of a relationship where Rth(B)/Rth(G) is substantially equal to R0(B)/R0(G) and a relationship where Rth(R)/Rth(G) is substantially equal to R0(R)/R0(G).

5. A liquid crystal display device, comprising:
a first polarizer;
a liquid crystal cell;
a second polarizer comprising an absorption axis azimuth that is orthogonal, in a plan view of a display surface of the liquid crystal cell, to that of the first polarizer, in this order; and a retardation film provided at least one of between the first polarizer and the liquid crystal cell, and between the second polarizer and the liquid crystal cell, wherein the retardation film comprises a reverse wavelength dispersion-type biaxial retardation film having an in-plane slow axis that is orthogonal, in a plan view of the display surface, to an absorption axis of a polarizer on the same side with respect to the liquid crystal cell, and satisfying equations (1) to (4) below, and the liquid crystal cell is a vertical alignment liquid crystal cell comprising a pair of transparent substrates, and provided therebetween a liquid crystal layer and at least blue, green and red color filter layers, and satisfying equations (5) and (6) below, $$0.954 \leq R0(B)/R0(G) \leq 0.965 \quad (1)$$

$$0.960 \leq Rth(B)/Rth(G) \leq 0.965 \quad (2)$$

$$1.031 \geq R0(R)/R0(G) \geq 1.015 \quad (3)$$

$$1.022 \geq Rth(R)/Rth(G) \geq 1.015 \quad (4)$$

$$0.936 \leq Rth\_LC(B)/Rth\_LC(G) \leq 1.000 \quad (5)$$

$$1.030 \geq Rth\_LC(R)/Rth\_LC(G) \geq 1.000 \quad (6)$$

where in equations (1) to (4), R0(B), R0(G) and R0(R) denote, respectively, the in-plane retardations of the reverse wavelength dispersion-type biaxial retardation film at wavelengths 450 nm, 550 nm and 650 nm, Rth(B), Rth(G) and Rth(R) denote, respectively, thickness-direction retardations of the reverse wavelength dispersion-type biaxial retardation film at wavelengths 450 nm, 550 nm and 650 nm, and in equations (5) and (6), Rth_LC(B), Rth LC(G) and Rth_LC(R) denote, respectively, thickness-direction retardations of the liquid crystal cell at wavelengths 450 nm, 550 nm and 650 nm.

6. The liquid crystal display device according to claim 5, wherein at least one of thicknesses d(R), d(G) and d(B) of the liquid crystal layer, corresponding to regions where the blue, green and red color filter layers are respectively provided, is different from the others of the thicknesses d(R), d(G) and d(B).

7. The liquid crystal display device according to claim 5, wherein the retardation film satisfies at least one of a relationship where Rth(B)/Rth(G) is substantially equal to R0(B)/R0(G) and a relationship where Rth(R)/Rth(G) is substantially equal to R0(R)/R0(G).

8. The liquid crystal display device according to claim 6, wherein the retardation film satisfies at least one of a relationship where Rth(B)/Rth(G) is substantially equal to R0(B)/R0(G) and a relationship where Rth(R)/Rth(G) is substantially equal to R0(R)/R0(G).

* * * * *